United States Patent
Bishop et al.

(10) Patent No.: US 7,218,796 B2
(45) Date of Patent: May 15, 2007

(54) PATCH-BASED VIDEO SUPER-RESOLUTION

(75) Inventors: Christopher M. Bishop, Cambridge (GB); Andrew Blake, Stapleford (GB); Bhaskara Marthi, Kensington, CA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/427,083

(22) Filed: Apr. 30, 2003

(65) Prior Publication Data
US 2004/0218834 A1 Nov. 4, 2004

(51) Int. Cl.
*G06K 9/32* (2006.01)

(52) U.S. Cl. ..................................... 382/299

(58) Field of Classification Search ................ 382/299, 382/254, 255, 298, 283, 282, 284, 155–159; 348/699–700, 441, 169, 561, 629, 581; 345/428, 345/629, 698; 358/1.2, 451, 428, 529
See application file for complete search history.

(56) References Cited

U.S. PATENT DOCUMENTS

| | | | | |
|---|---|---|---|---|
| 4,485,409 A | * | 11/1984 | Schumacher | 358/479 |
| 6,411,333 B1 | * | 6/2002 | Auld et al. | 348/441 |
| 6,434,280 B1 | * | 8/2002 | Peleg et al. | 382/299 |
| 6,766,067 B2 | * | 7/2004 | Freeman et al. | 382/299 |

* cited by examiner

*Primary Examiner*—Ishrat Sherali

(57) ABSTRACT

A low spatial frequency video sequence is enhanced to provide a higher spatial frequency video sequence using a super-resolution process. Patches of higher frequency image data are inferred from the images of the lower frequency video sequence and a dictionary containing a training set of higher resolution image data. An inference module selects result patches from the training set to preserve spatial consistency within each image frame and to preserve temporal consistency, between image frames of the resulting video sequence. Temporal consistency can be preserved for static portions and/or moving portions of each frame.

54 Claims, 8 Drawing Sheets

PATCH-BASED VIDEO SUPER-RESOLUTION

TECHNICAL FIELD

The invention relates generally to processing images and video sequences, and more particularly to improving video resolution.

BACKGROUND

Digital video cameras are useful in both consumer and professional contexts. Generally, digital video cameras can capture multiple sequential frames (e.g., a video sequence) of a subject or scene. The captured video sequence may then be transferred to a computer system for display or stored in a storage device, among other actions.

Video data is often streamed over a communications network, such as the Internet. For example, users can view streamed trailer videos from upcoming movies through many different Web sites. However, these streamed videos often have a low spatial frequency of video information in each frame, in large part because of bandwidth limitations in the communications channel.

Some approaches for enhancing spatial frequency of an image or video sequence include merely interpolating between low resolution pixels or groups of pixels to infer higher resolution pixels between them and, alternatively, filtering the image data to enhance the higher frequency information along edges in the image. However, interpolating merely yields a higher resolution image without providing the higher frequency image data needed to improve image sharpness. In contrast, while the filtering approach can improve sharpness, it can also amplify noise in the image, diminishing the overall apparent improvement in the higher resolution image, especially in a video sequence.

SUMMARY

Implementations described and claimed herein solve the discussed problems by selecting high spatial frequency patches to enhance images of a lower spatial frequency video sequence. The lower spatial frequency video sequence is processed to provide a higher spatial frequency video sequence using a super-resolution process. Patches of higher frequency image data are inferred from the images of the lower frequency video sequence and a dictionary containing a training set of higher resolution image data. An inference module selects result patches from the training set to preserve spatial consistency within each image frame and to preserve temporal consistency, between image frames of the resulting video sequence. Temporal consistency can be preserved for static portions and/or moving portions of each frame.

In some implementations, articles of manufacture are provided as computer program products. One implementation of a computer program product provides a computer program storage medium readable by a computer system and encoding a computer program that computes a result image in a result video sequence from a source image of a source video sequence. Another implementation of a computer program product may be provided in a computer data signal embodied in a carrier wave by a computing system and encoding the computer program that computes a result image in a result video sequence from a source image of a source video sequence.

The computer program product encodes a computer program for executing on a computer system a computer process for computing a result image in a result video sequence from a source image of a source video sequence. The result image has higher spatial frequency image data than the source image. A result patch is selected for association with a source patch location of the source image. The result patch is selected such that spatial consistency within the result image and temporal consistency within the result video sequence are preserved.

In another implementation, a method of computing a result image in a result video sequence from a source image of a source video sequence is provided. The result image has higher spatial frequency image data than the source image. A result patch is selected for association with a source patch location of the source image. The result patch is selected such that spatial consistency within the result image and temporal consistency within the result video sequence are preserved.

In yet another implementation, a system for computing a result image in a result video sequence from a source image of a source video sequence is provided. The result image has higher spatial frequency image data than the source image. An inference module selects a result patch for association with a source patch location of the source image. The result patch is selected such that spatial consistency within the result image and temporal consistency within the result video sequence are preserved.

DETAILED DESCRIPTION

The term "super-resolution" generally refers to enhancing the spatial frequency of a source image or video sequence. For example, given an image consisting of low frequency spatial information, super-resolution may be used to infer higher frequency spatial information into a corresponding result image, thereby yielding a sharper image.

In one implementation, each image or frame of video sequence is divided into a grid of "patches". A higher spatial frequency counterpart of one or more of these patches is rendered to yield a result image with higher frequency spatial information. A sequence of the higher spatial frequency images can provide an enhanced video sequence. The higher spatial frequency counterpart of each patch is inferred using a training set or some other source of higher frequency image data. The training set is developed from high spatial frequency image data that may or may not be independent of the source image or video sequence. Consideration of patches in the proximity of the current patch location may also be employed to contribute to spatial consistency across the image.

In another implementation, temporal consistency the high spatial frequency result images of a result video sequence is enhanced using spatial information from corresponding or related patches in other frames of a video sequence. Enhancing the temporal consistency stabilizes the frame-to-frame inference of the high frequency information for images in the video sequence, thereby reducing artifacts (e.g., flicker) between sequential frames.

Figure 1:
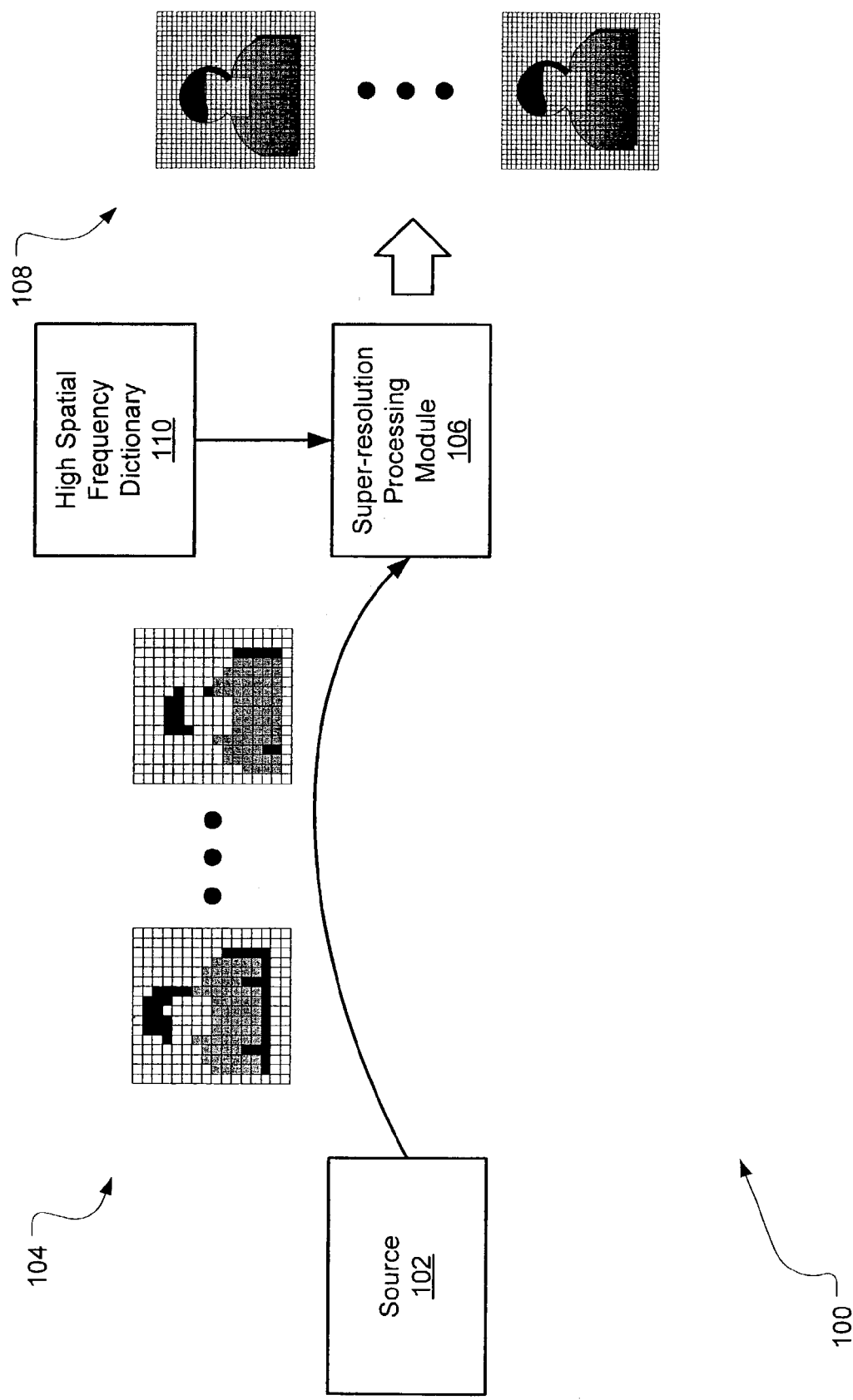
FIG. 1 illustrates an exemplary super-resolution system generating a high spatial frequency image.

FIG. 1 illustrates an exemplary super-resolution system 100 generating a high spatial frequency image. A source 102, such as a streaming video server, provides a video sequence 104 of low-resolution frames to a super-resolution processing module 106. In one implementation, the video sequence 104 is transmitted via a communications network from the source 102 to a client executing the super-resolution processing module 106 to generate a high-resolution video sequence 108. In another embodiment, the source 102 may take the form of a server process resident on the client or on a storage system coupled to the client. Furthermore, a client may take the form of a client process on a server system, such that the server receives the video sequence 104 and performs the super-resolution computations to generate the high-resolution video sequence 108.

The super-resolution processing module 106 receives the low spatial frequency image data of the frames in the low-resolution video sequence 104, representing each frame as a grid of (possibly overlapping) pixel sets referred to as "patches". For example, individual patches in various implementations may take the form of a 5 pixel by 5 pixel squares laid out on a grid on the image having 5×5 pixels square elements or 4×4 pixel square elements. It to be understood, however, that other patch and grid sizes and shapes are contemplated.

The super-resolution processing module 106 also receives training set data from a high spatial frequency dictionary 110. The training set data is used by the super-resolution processing module 106 to infer high spatial frequency image data for individual patches in the each frame of the video sequence 104 to generate the high-resolution video sequence 108.

Figure 2:
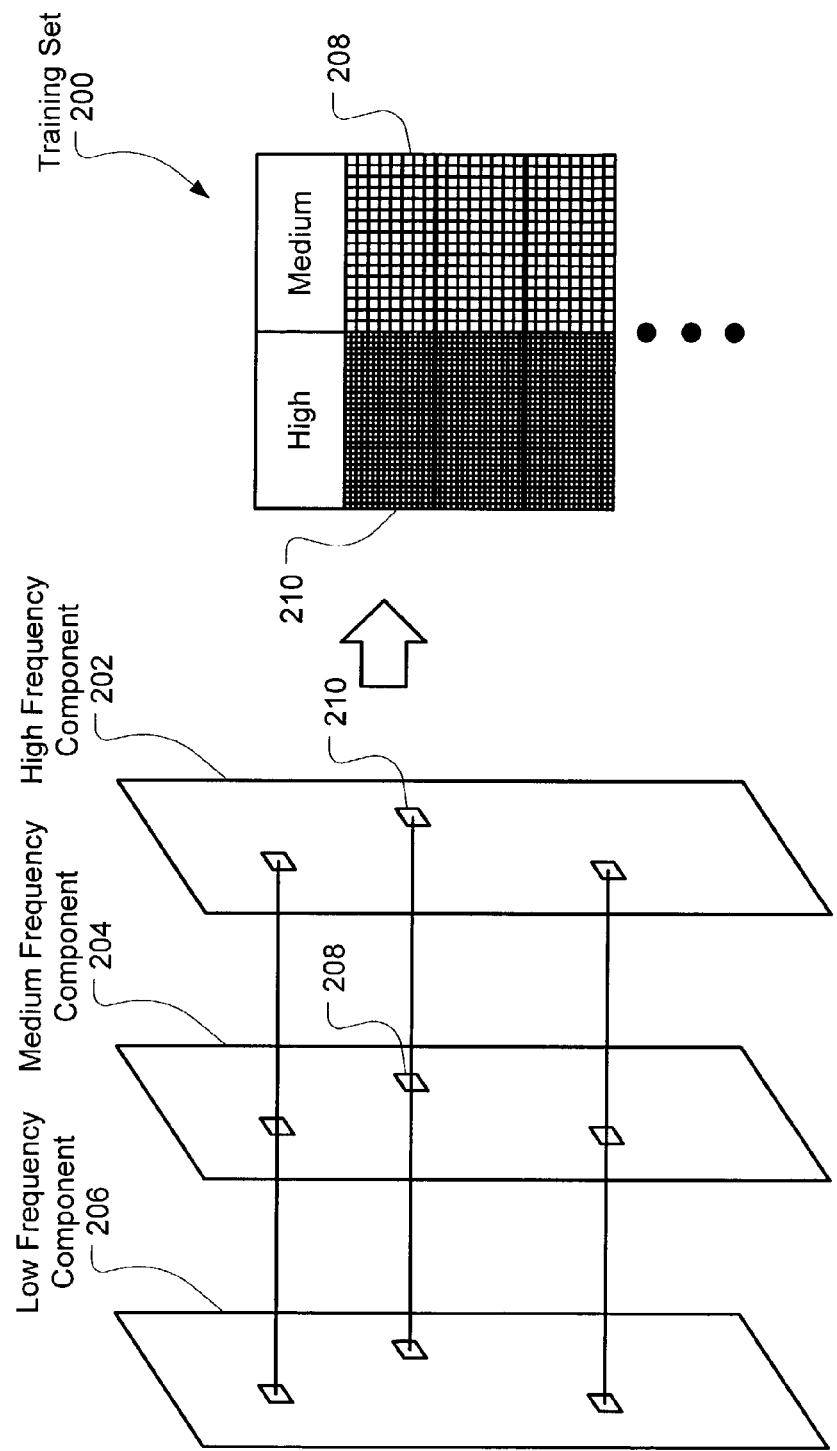
FIG. 2 depicts an exemplary training set 200 and a conceptual illustration of the training set data.

FIG. 2 depicts an exemplary training set 200 and a conceptual illustration of the training set data. The training set 200 is stored in a dictionary including high-resolution training images. In one implementation, bandpass filtering is used to decompose each high-resolution training image into three image components 202, 204, and 206 containing, respectively, high, medium, and low spatial frequencies. Alternatively, any set of high resolution image data with a corresponding set of medium resolution image data may be employed in the training set data. It should be understood that either one of the medium and low spatial frequency components may be omitted. Therefore, the implementation can generate a higher-frequency image from any lower frequency image.

For each high-resolution training image, a large number of patches from the medium frequency component 204 and corresponding patches from the high frequency component 202 are extracted to yield training set patch pairs. The patch grids among the three components are aligned such that a patch from one component corresponds to a patch in another component (e.g., each medium spatial frequency patch corresponds with a high spatial frequency patch). The patch pairs may be normalized using a local measure of the energy in the image.

Each patch may be represented by a vector. For example, a medium frequency 7×7 patch in a color image may be represented by a vector x of length 3×7×7=147 (allowing for the three color channels). In one implementation, this dimensionality is reduced by performing principal component analysis (PCA) on the set of median frequency patches to reduce their dimensionality to 20. This reduction increases the speed of the nearest neighbor computations used to match test patches into the dictionary.

In at least one implementation, a training algorithm can construct patches as follows, although other algorithms are also contemplated:

1. Perform a local smoothing of the image to remove the high frequency information, leaving an intermediate image that is regarded as a sum of low and medium frequencies. Local smoothing may be achieved by convolving the image with the kernel shown below (or with any other appropriate smoothing kernel whose structure may be designed to express the known properties of the image capture system to which the final system will be applied):

$$\begin{pmatrix} 0.0 & 0.25 & 0.0 \\ 0.25 & -1.0 & 0.25 \\ 0.0 & 0.25 & 0.0 \end{pmatrix}$$

2. Subtract the smoothed image from the original image to leave a high frequency image.
3. Take the intermediate image and smooth by convolution with a Gaussian kernel to give a low frequency image.
4. Subtract the low frequency image from the intermediate image to leave a medium frequency image. Note that the original image and the low, medium, and high frequency images all have the same spatial resolution in this implementation.
5. Take the square of the pixel intensities in the medium frequency image, smooth and then take the square root (adding $\epsilon=0.01$ to avoid subsequent division by zero). Divide both the medium and high frequency images by this energy image to achieve local intensity normalization.
6. Extract all possible patches of size 7×7 pixels from the medium frequency image along with the corresponding (concentric) patches of size 5×5 from the high frequency image.

The exemplary training set 200 depicts the patch pairs from high frequency components and medium frequency components. For example, image data from a patch 208 of medium frequency component 204 and a corresponding patch 210 of high frequency component 202 are stored in association in a dictionary.

In one implementation, the dictionary of patch pairs is compiled into a tree to facilitate fast searching (e.g., a kd-tree in a coordinate system defined by PCA), although other searchable data structures are also contemplated. To construct the tree, a component i of the 20-dimensional space, along which the set of medium frequency patches has the greatest variance, is selected. The data set is then split into two sets using a cut at the median value m of that component. The cut is represented by a node in the graph at which the values of i and m are stored. The partitioning is repeated on each of the subsets recursively until the tree of a given depth is created. Each leaf node of the tree represents a corresponding sub-set of path pairs. An exemplary configuration results in 200,000 patch pairs from several images being distributed in a tree of depth 10. This exemplary configuration has 1,024 leaf nodes, each representing roughly 200 patch pairs. An index into the training images and the location within those images, from which each patch pair arose, is also constructed, as well as a corresponding inverse index.

Figure 3:
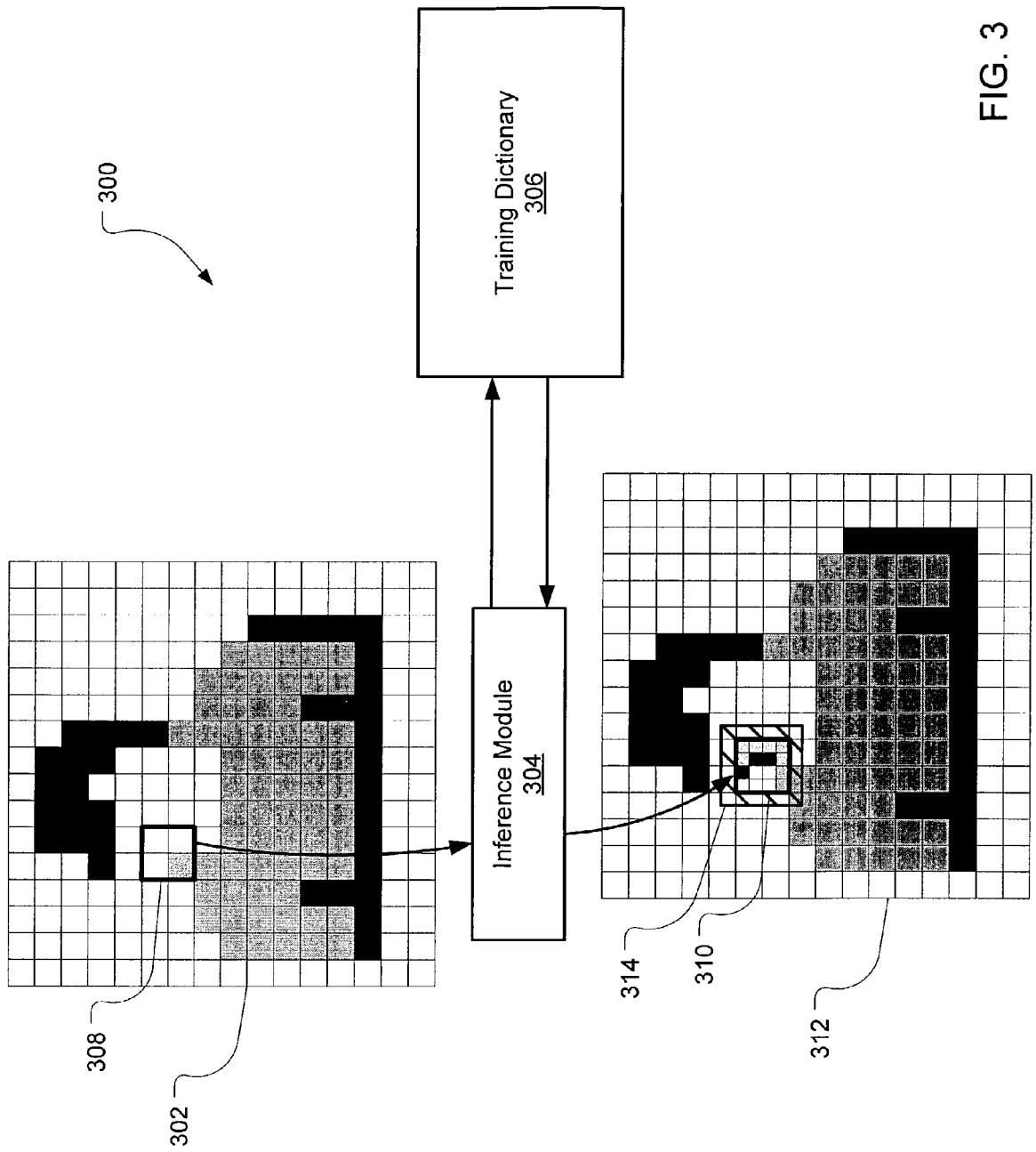
FIG. 3 illustrates an exemplary inference operation relating to spatial consistency.

FIG. 3 illustrates an exemplary inference operation 300 relating to spatial consistency. A reduced resolution source image is received by a super-resolution system, which extracts the low spatial frequency component (not shown) and the medium spatial frequency component 302 from the source image. It should be understood that the source image typically represents one frame of a video sequence. The low and medium spatial frequency components are input to an inference module 304. The low spatial frequency component and the medium spatial frequency component 302 are divided into grids of patches (e.g., each patch being four pixels by four pixels square). The inference module 304 also has access to training set data in the training dictionary 306.

For each patch (e.g., patch 308) of the medium spatial frequency 302, the inference module 304 finds the "closest matching" medium spatial frequency patch from the training dictionary 306. A high spatial frequency patch in the training dictionary 306 that corresponds to this closest matching medium spatial frequency patch is used to add high spatial frequency data to the corresponding patch in the source image (i.e., to the corresponding patches in the low and medium spatial frequency component).

In this description, the medium frequency patches from the training set are represented by vectors $x_k$, where k=1, ..., M and M is the total number of patch pairs in the training dictionary 306. The corresponding high frequency patches are represented by $y_k$. Also, $z_k = (x_k, y_k)$ represents the $k^{th}$ patch pair, and $D_0 \equiv \{z_k\}$ represents the complete training dictionary.

In one implementation, the "closest match" is based on an $L_2$ norm (or some other match algorithm) as shown in the primary cost function of Equation (1), where the vector x represents a patch in medium spatial frequency component 302:

$$\epsilon_k(x) = L_k(x) = \|x - x_k\|^2 \qquad (1)$$

Referring to Equation (1), therefore, the inference module 304 finds the "closest match" patch pair in the training dictionary 306 by optimizing (e.g., minimizing) $\epsilon_k(x)$. The high resolution patch (i.e., the "result patch") of the "closest match" patch pair, which is identified by the index k corresponding to the optimized cost function, is used to enhance the resolution of the original source image by generating an inferred high spatial frequency patch 310 in a result image 312.

In one implementation, the dictionary patch index k is selected as indicating the patch minimizing $\epsilon_k$, although other optimizations may be employed, such as satisfying a minimal threshold condition or optimizing to a given value. As one or more of the medium spatial frequency patches are processed by the inference module 304, the corresponding high spatial frequency result patches are added to the result image 312 to yield a "high resolution" result image.

In a second implementation, the "closest match" is based on an $L_2$ norm (or some other match algorithm) modified by a prior encouraging patch-continuity in the high resolution result image 312, as shown in the total cost function of Equation (2) below. Equation (2) takes into consideration "spatial consistency" of the high resolution candidate patch when selecting the closest match patch pair. In this implementation, high resolution candidate result patches from the training dictionary 306 have a greater size than the grid overlaying the image 302 and 312, such that adjacent candidate patches overlap with other already-replaced patches in the grid. For example, (5×5) patches distributed over a grid of 4×4 squares results in an overlap 314 (consisting of "overlap patches") of one pixel between adjacent patches. The total cost function for this second implementation is shown in Equation (2):

$$\epsilon_k^{(\alpha)}(x) = L_k(x) + \alpha V(y_k, \{y_{k'}: k' \in N_x\}) \qquad (2)$$

where $N_x$ represents the set of indices for patch pairs corresponding to patches that include neighbors of patch x in the synthesized high frequency image 312, $y_{k'}$ represents a high resolution result patch corresponding to the overlap regions, and $V(\cdot, \cdot)$ represents a spatial consistency cost function applied in the overlap regions.

In one implementation, the spatial consistency cost function measured the sum-squared $L_2$-norm difference of (R,G,B) values in the overlap region, although other matching algorithms may also be used. The parameter $\alpha$ represents a weight factor applied to the spatial consistency term as compared to the first order cost function of Equation (1). An exemplary value for the parameter a is 0.6, although other values are also contemplated. As such, because the spatial consistency cost function term is added to the primary total cost function in Equation (2), the spatial consistency cost function term adds a penalty that measures the mismatch of a result patch y to its neighbors in the synthesized high frequency result image.

Referring to Equation (2), therefore, the inference module 304 finds the "closest match" patch pair by optimizing (e.g., minimizing) the cost function $\epsilon_k^{(\alpha)}(x)$. The high resolution patch of the "closest match" patch pair is used to enhance the resolution of the original source image by generating an inferred high spatial frequency patch 310 in the result image 312. In one implementation, the dictionary patch indicated by index k that minimizes the cost function $\epsilon_k^{(\alpha)}(x)$ is selected as the result patch. As one or more of the medium spatial frequency patches are processed by the inference module 304, the corresponding high spatial frequency result patches are added to the result image 312 to yield a "high resolution" result image.

The optimization of Equation (2) may be achieved by a variety of algorithms. An exemplary algorithm employs an approximate procedure in which the high frequency super-resolution image is generated by raster scanning the source image and choosing, at each step, a dictionary patch based only on those high frequency patches that have already been filled in. For example, in raster scan order (top-left to bottom-right), the patches above and to the left of the current patch are most likely (but not always) filled. Therefore, the selection of the dictionary patch is based on these filled patches. Additionally, it may be desirable to rescan the entire frame after a first scanning iteration is completed. In the rescanning iteration of this implementation, all patches that surround the current patch have all ready been filled. Therefore, all such patches are used in selecting the dictionary patch. Where high frequency patches overlap, the corresponding pixels of the super-resolution high frequency image may be determined by averaging.

As such, in one implementation, the inference module 304 outputs a super-resolution high frequency image (i.e., the end result of the incremental image 312). Having access to a training dictionary 306, the inference module 304 scans over the target image 302 in a raster (e.g., using a grid spacing of 4×4 pixels). For each grid spacing, a number of candidate best matching patch pairs (e.g., of 5×5 pixels) are selected from the training dictionary 306 using an optimization of Equation (1), such as by using a best bin first approach. From this sub-dictionary of candidate patch pairs, the inference module 304 determines the best match by optimization of Equation (2).

A result high frequency component is generated by compiling the high frequency patch pair elements from the best matching patch pair for each 4×4 grid element. Where high frequency patches overlap, the average pixel values are averaged. The result high spatial frequency component is then added to the low and medium spatial frequency components of the source image to yield the super-resolution high spatial frequency image of the source image.

The foregoing description focuses primarily on maintaining spatial consistency in a single image or frame. However, further enhancement of a video sequence may be achieved by enforcing some measure of temporal consistency, which decreases the appearance of flicker in the resulting super-resolution high spatial frequency video sequence.

Figure 4:
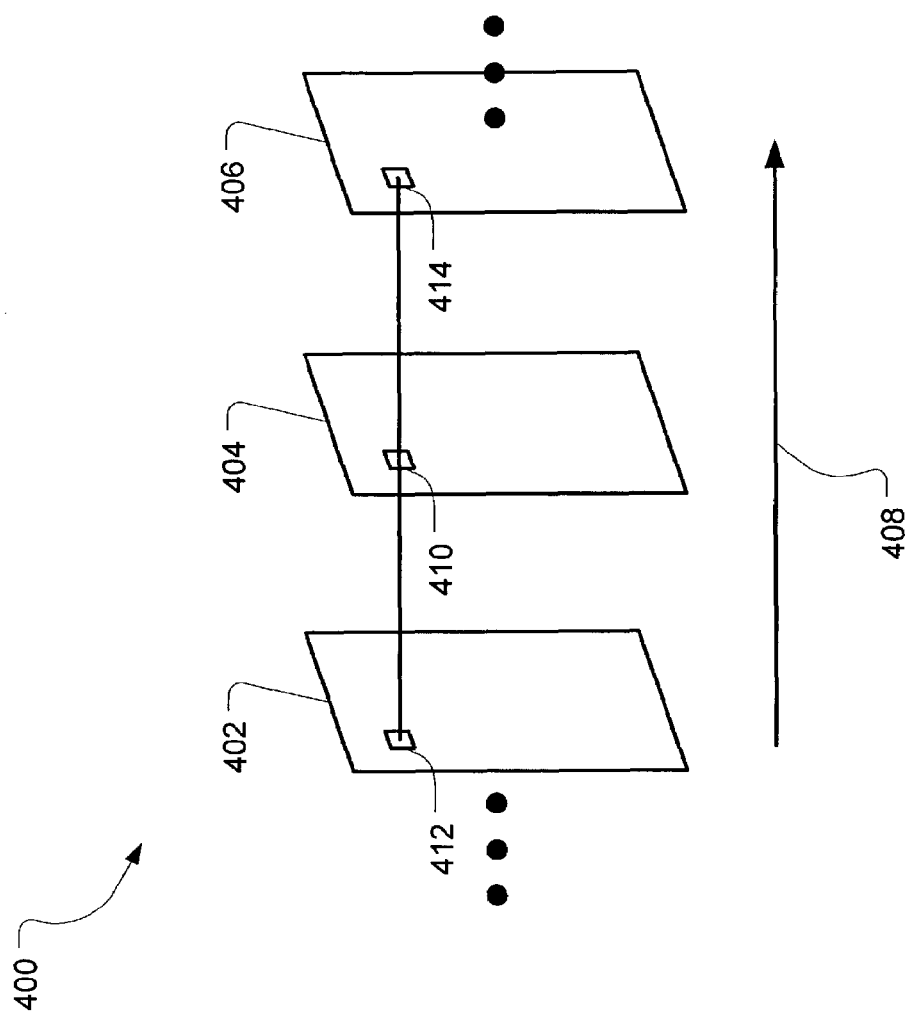
FIG. 4 illustrates a portion of an exemplary inference operation relating to temporally static consistency.

FIG. 4 illustrates a portion of an exemplary inference operation relating to temporally static consistency. A portion of a video sequence 400 shows three frames 402, 404, and 406 in the sequence progressing in the direction shown by an arrow 408.

The concept of temporal consistency rests on the notion that static or relatively static patches of adjacent video frames should contain the same or very similar synthesized high spatial frequency image data. For example, the background of video of a newscaster is likely to include relatively static image data, such as image data of a wall or desk in a television stage set.

As such, if a patch 410 in current frame 404 corresponds to such static image data, inferences about other corresponding patches (such as 412 or 414) in the temporal proximity (whether forward or backward in the sequence) of the patch 410 may be used in synthesizing the high spatial frequency data for the patch 410. It should be understood that temporal proximity may include one or more frames immediately adjacent to or some number of frames away from the current frame 404.

In one implementation, the total cost function for each patch is modified so as to favor re-use of the high frequency patch used in that location in another frame (e.g., the immediately previous frame or some other frame). The extent to which re-use of the high frequency patch is favored is governed by a temporal stasis weighting parameter β. Therefore, an exemplary resulting total cost function is shown in Equation (3):

$$\epsilon_k^{(\alpha,\beta)}(x) = L_k(x) + \alpha V(y_k, \{y_{k'}: k' \in N_x\}) - \beta I(y = y_k(t-1)) \quad (3)$$

where I(·) is the binary indicator function and the frame index is denoted by the discrete time variable t. If the high frequency patch y selected from the dictionary for the current patch matches the corresponding high frequency patch in the previous frame, then the cost of using the selected patch is decreased by β. This modification increases the probability (i.e., by lowering the cost) that the high frequency data added to original source image at this location will be the same as the corresponding patch in the previous frame.

By empirical optimization, a value of $\beta_0$ has been determined, as shown in Equation (4):

$$\beta_0 = \left\langle L_k(x^{(t-1)}) - \min_{x \in D_0} L_k(x^{(t)}) \right\rangle_{k,t} \quad (4)$$

wherein $\langle \cdot \rangle_{k,t}$ represents an average over all of the patch locations and over all frames of the sequence. In one implementation, good results have been found by setting $\beta = \beta_0$, although other implementations may employ a different value for β. The β term shown in Equation (3) has been found to substantially reduce the level of temporal artifacts in relatively static regions of a video sequence, with less improvement, if any, in regions of the video sequence containing motion.

Even further enhancement of a video sequence may be achieved by enforcing some measure of temporal consistency in regions of the video sequence exhibiting motion. One implementation, as described by Equation (5), considers when objects are moving slowly from frame to frame by introducing a temporal motion weighting parameter γ. The γ term encourages the added high frequency component to move coherently with the object.

Figure 5:
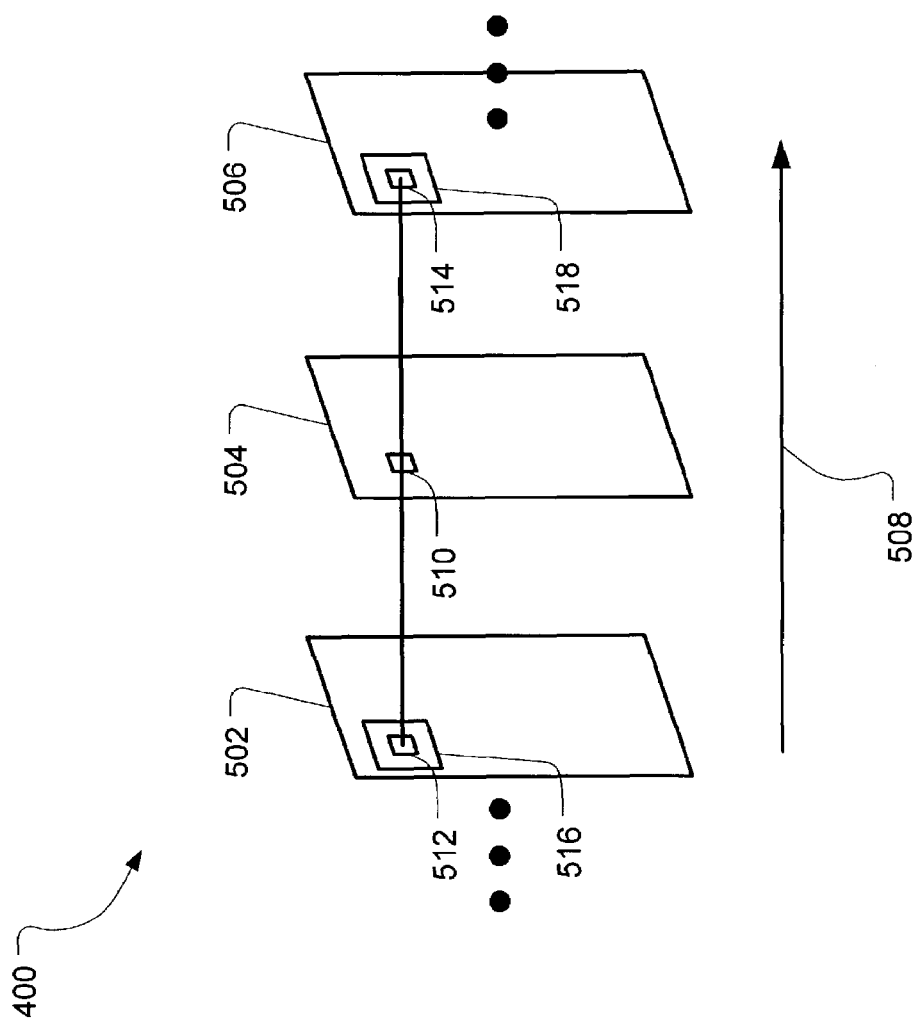
FIG. 5 illustrates a portion of an exemplary inference operation relating to temporal motion consistency.

FIG. 5 illustrates a portion of an exemplary inference operation relating to temporal motion consistency. A portion of a video sequence 500 shows three frames 502, 504, and 506 in the sequence progressing in the direction shown by an arrow 508.

As such, if a patch 510 in current frame 504 corresponds to such temporal motion image data, inferences relating to other corresponding patches (such as 512 or 514) in the temporal proximity (whether forward or backward in the sequence) of the patch 510 may be used in synthesizing the high spatial frequency data for the patch 510. It should be understood that temporal proximity may include one or more frames immediately adjacent to or some number of frames away from the current frame 504.

In one implementation, the total cost function for each patch is modified so as to favor re-use of a previously inferred high frequency result patch used in the proximity of the current result location in another frame (e.g., the immediately previous frame or some other frame). The extent to which re-use of the high frequency patch is favored is governed by the temporal motion weighting parameter β.

In Equation (3), the previous frame and its super resolved counterpart are considered to form a temporary training set from which additional patch pairs are extracted to augment the fixed training dictionary $D_0$. For each patch in the current frame, a sub-set of patch pairs (high and medium frequency patches) corresponding to locations within a proximal region (e.g., 516 or 518) relative to the current patch location. In the illustrated implementation, the proximal region is a rectangular window centered at the patch location. In another implementation, the proximal region is a circular window centered at the patch location and having a radius r=2 pixels, although other shapes and orientations of the proximal region are also contemplated. This sub-set of patch pairs forms a temporary dictionary $D_k^{(t-1)}$.

$$\epsilon_k^{(\alpha,\beta,\gamma)}(x) = L_k(x) + \alpha V(y_k, \{y_{k'}: k' \in N_x\}) - \beta I(y = y_k(t-1)) - \gamma I(y \in D_k^{(t-1)}) \quad (5)$$

where the augmented dictionary is represented by $D_0 \cup D_k^{(t-1)}$.

In one implementation, the patch pair from the current patch location of another frame is not included in the temporary dictionary because it is already been considered in the temporal stasis term. However, in other implementations, the patch pair from the current patch location of another frame may be included in the temporary dictionary, with or without modification or alternative weighting. Furthermore, in one implementation, good results have been found by setting $$\gamma = -\frac{1}{2}\beta_0,$$

although other implementations may employ a different value for $\gamma$.

Figure 6:
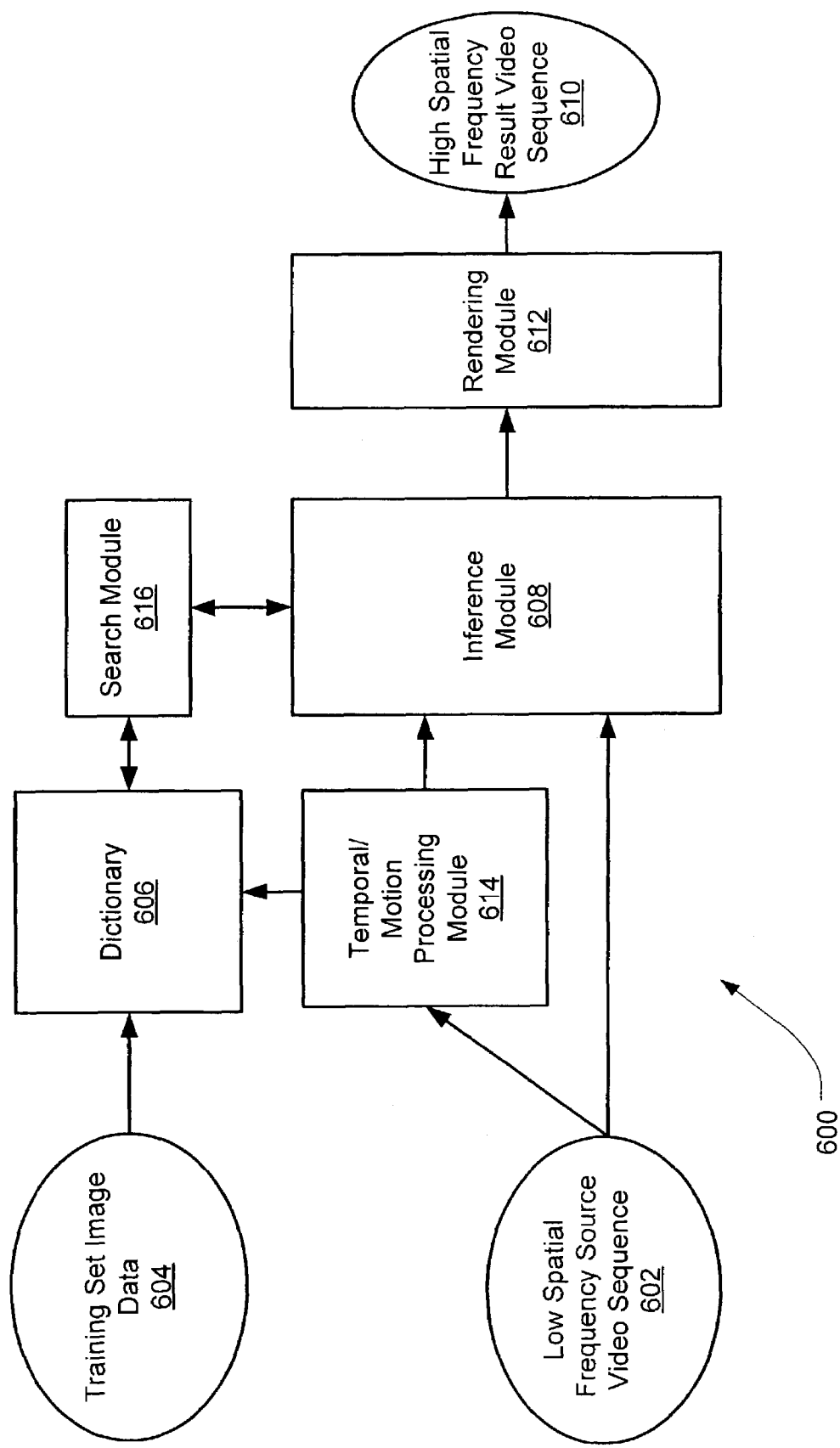
FIG. 6 illustrates an exemplary system for enhancing spatial frequency of a source image.

FIG. 6 illustrates an exemplary system 600 for enhancing spatial frequency of a source image. A low spatial frequency video sequence 602 is input to the system 600. Training set data 604 is input to a dictionary 606, although this operation need not be performed concurrently with the input of the video sequence 602. That is, the dictionary 606 may contain arbitrary training set data that is unrelated to and input independently of the video sequence 602, or the dictionary 606 may contain training set data containing image data related to the video sequence (e.g., high spatial frequency sample frames from the video sequence). In addition, the additional training set data may supplement or replace the data in the dictionary 606. For example, as the video is streaming, new training set data (e.g., new high spatial frequency frames from the video sequence) may be input to the dictionary, supplementing or replacing other training set data already stored in the dictionary, to provide a higher quality inference operation.

An inference module 608 receives the low spatial frequency video sequence 600. In one implementation, the inference module 608 selects result patches to construct the image data for a high spatial frequency video sequence 610, which is rendered as a sequence of image frame by a rendering module 612. The selected result patches are selected to preserve spatial consistency within each result image frame and to preserve temporal consistency within the result video sequence 610. A temporal/motion processing module 614 assists in preserving the temporal consistency by caching corresponding patches of temporally displaced images frames for consideration in a statis prior and/or a motion prior. For example, the temporal/motion processing module 614 temporarily augments the dictionary 606 with proximity patches (i.e., as used in $D_k^{(t-1)}$) from temporally displaced image frames.

A search module 616 searches the dictionary 606 for candidate patch pairs, responsive to queries from the inference module 608. The search module 616 19 employs highly efficient search based on the kd-tree data structure in the dictionary 606 in combination with a "best bin first" algorithm. For example, this approach can be used to find the best 100 candidate patch pairs from the dictionary 606. For each new source patch, the tree is first traversed to find the leaf node to which the source patch is associated. During the tree traversal, a priority queue is maintained that specifies, at each decision branch, the distance of the leaf node from the cut boundary associated with the alternate branch. The source patch is then compared with each of the patch pairs associated with the leaf node to find the current 100 best matches. Then, the next closest leaf node region is determined using the priority queue, and the corresponding leaf node set is examined, thereby revising the list of 100 best match patch pairs. This process repeats until the search terminates (when the worst of the 100 best candidates is closer than the nearest remaining leaf node region) or when the maximum of 100 leaf nodes have been examined.

The exemplary system illustrated in FIG. 6 can perform the super-resolution process described herein. In addition, an alternate implementation provides some short cuts to provide improved performance, as shown in flow diagram 700 in FIG. 7.

Figure 7:
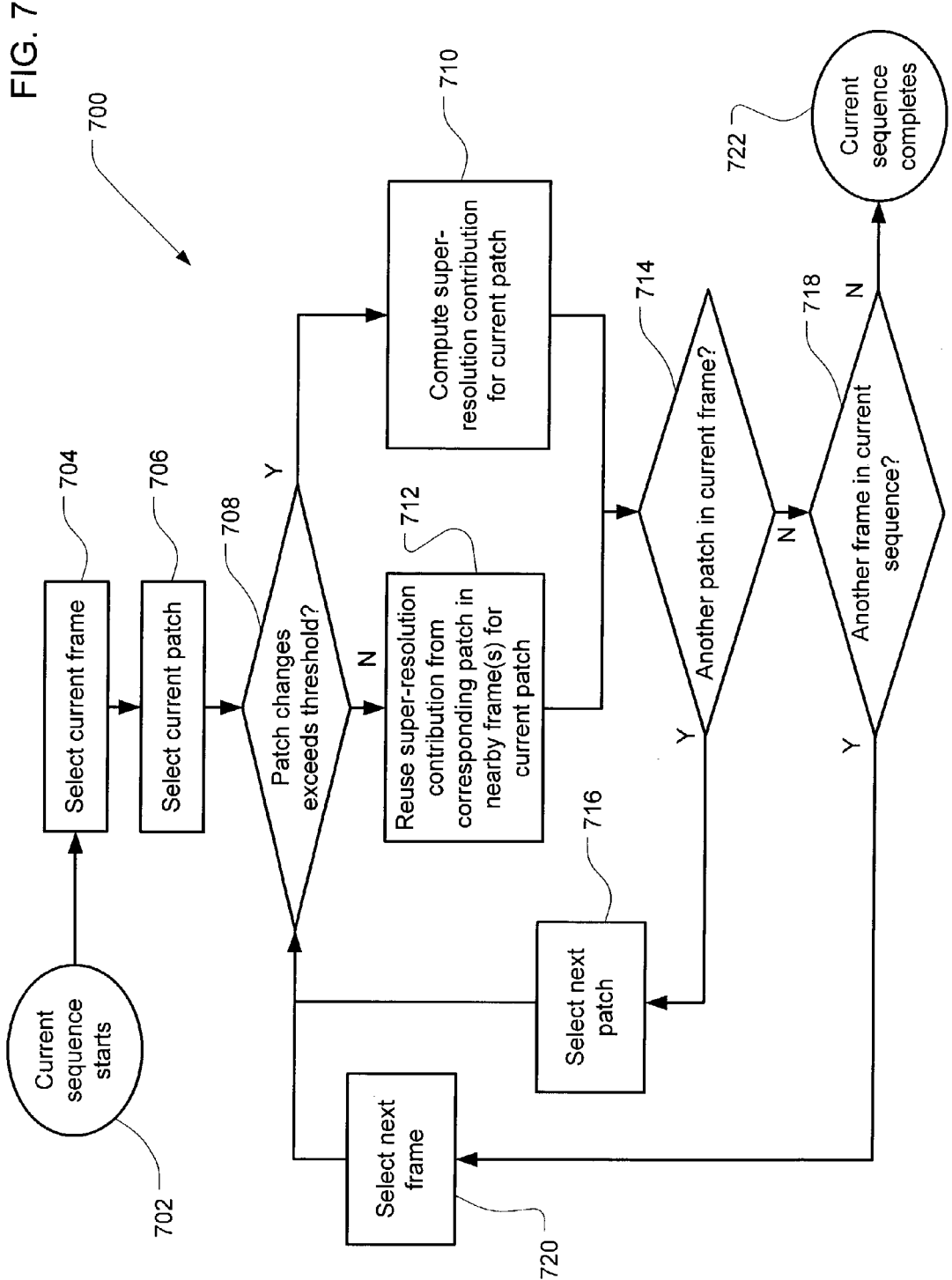
FIG. 7 illustrates exemplary operations for enhancing the spatial frequency of a video sequence.

FIG. 7 illustrates exemplary operations 700 for enhancing the spatial frequency of a video sequence. A low spatial frequency video sequence starts at starting point 702. A selection operation 704 selects a current image frame from the video sequence and overlays a patch grid. A selection operation 706 selects a current patch from the current image frame. A decision operation 708 determines whether the differences between the current patch of the current image frame and a corresponding patch from another image frame exceed a predetermined threshold (in the first loop, this test may be skipped). If so, a computation operation 710 selects a high spatial frequency patch using the current source patch, the dictionary, and other image data within the video sequence and combines the selected high spatial frequency patch with the low and medium frequency patch components of the current patch. If not, as might be the case in a static portion of a video sequence, the high frequency patch from another image frame is reused and combined with the low and medium frequency patch components of the current patch in a reuse operation 712.

A decision operation 714 determines if there is another patch to be processed in the current frame. If so, a selection operation 716 selects the next patch in the image frame as the current patch and proceeds to decision operation 708. If not, decision operation 718 determines if there is another frame to be processed in the current selection. If so, a selection operation 720 selects the next frame in the video sequence as the current image frame and proceeds to decision operation 708. If not, processing of the current video sequence completes at ending point 722.

Figure 8:
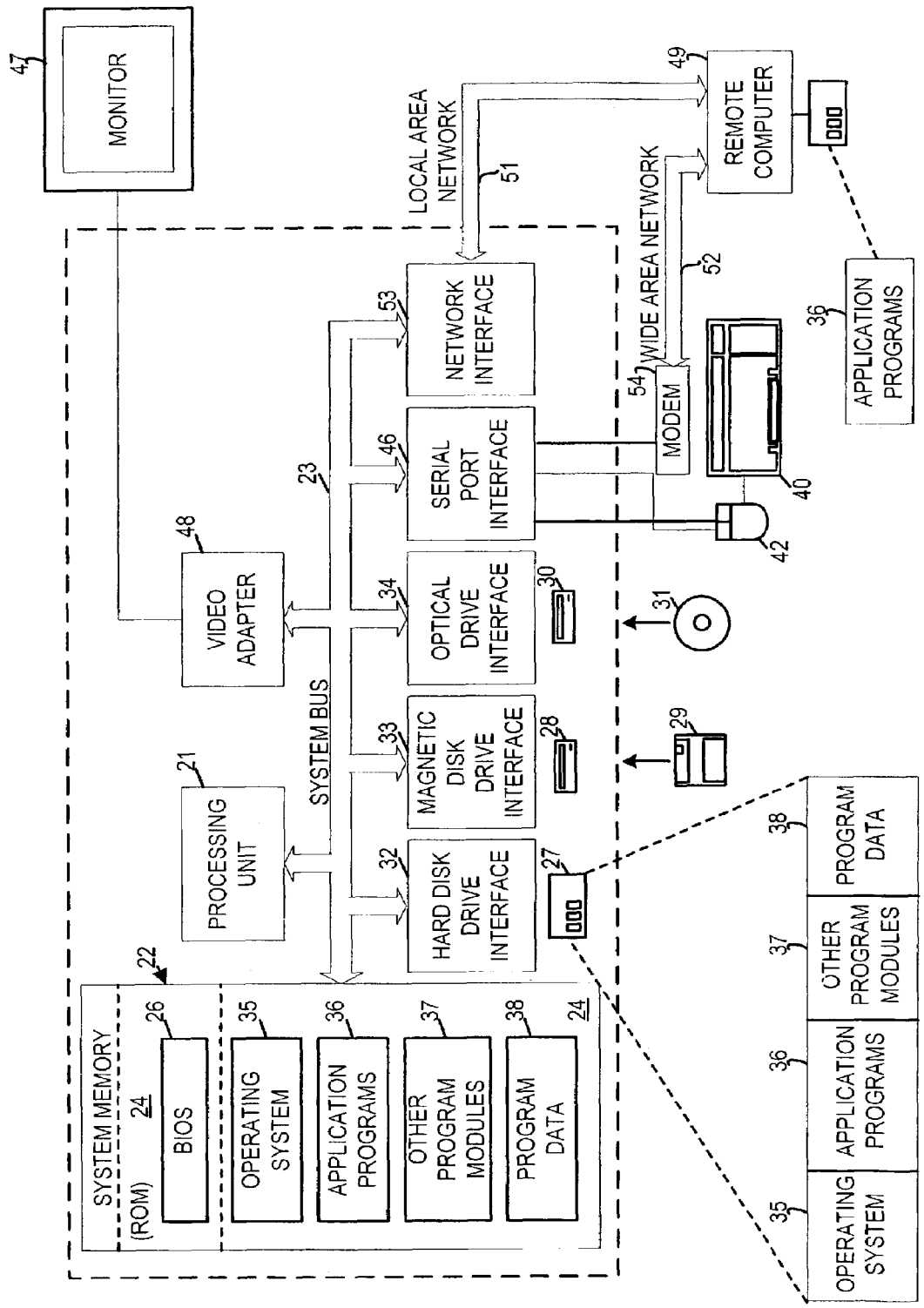
FIG. 8 illustrates an exemplary system useful for implementing an embodiment of the present invention.

The exemplary hardware and operating environment of FIG. 8 for implementing the described system includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, an inference module, a rendering module, a temporal/motion processing module, or a search module may be incorporated as part of the operating system 35, application programs 36, or other program modules 37. The training set date, low spatial frequency image data, medium spatial frequency image data, and high spatial frequency image data may be stored as program data 38.

It should be understood that, while the foregoing description discusses medium/high spatial frequency patch pairs and source patches, alternative implementations may use patches from components having other frequencies, such low spatial frequency components. Also, the terms, "high", "medium", and "low", when used to describe resolution or spatial frequency are intended to be relative to each other, without reference to any particular standard of resolution or spatial frequency.

Furthermore, the cost function terms disclosed herein are merely exemplary, and it should also be understood that terms in any cost function employed to enhance a source image or video sequence may be used or optimized individually in various implementations. For example, an implementation may use a spatial consistency cost function to obtain spatial consistency within an image and independently use a temporal consistency cost function across multiple images of a video sequence.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of computing a result image in a result video sequence from a source image of a source video sequence, the result image having higher spatial frequency image data than the source image, the method comprising:
   selecting, from a training set, a result patch for association with a source patch in a source patch location of the source image, the result patch being selected such that a cost function relating the source patch to a lower frequency patch associated with the selected result patch is optimized and spatial consistency within the result image and temporal consistency within the result video sequence are preserved.

2. The method of claim 1 wherein the training set includes high spatial frequency image data.

3. The method of claim 1, wherein the result patch is associated with a result patch location in the result image, one or more result proximity patches are located in the proximity of the result patch location in the result image, and the cost function further relates the one or more result proximity patches in the result image to at least a portion of the result patch that overlaps the one or more result proximity patches.

4. The method of claim 3 wherein the cost function further relates the result patch to a corresponding patch in a temporally displaced image of the result video sequence.

5. The method of claim 3 wherein the cost function further relates the result patch to a corresponding patch in a temporally previous image of the result video sequence.

6. The method of claim 4 wherein the result patch is selected from a training set including high spatial frequency image data and further comprising:
augmenting the training set with one or more proximity patches of the temporally displaced image of the result video sequence, each proximity patch being in proximity to a patch in the temporally displaced image that corresponds to the result patch location in the result image.

7. The method of claim 4 wherein the result patch is selected from a training set including high spatial frequency image data and further comprising:
augmenting the training set with one or more proximity patches of a different temporally displaced image of the result video sequence, each proximity patch being in proximity to a patch in the different temporally displaced image that corresponds to the result patch location in the result image.

8. The method of claim 6 wherein the cost function further relates the result patch to the one or more of the proximity patches.

9. The method of claim 1 wherein the result patch is associated with a result patch location in the result image and the selecting operation comprises: selecting the result patch that optimizes a cost function associated with the result patch location.

10. The method of claim 1 wherein a source patch is located at the source patch location within the source image, the result patch is associated with a result patch location in the result image, and the selecting operation comprises: selecting the result patch that optimizes a cost function associated with the result patch location, the cost function characterizing a relationship between the source patch and a lower frequency patch associated with the result patch.

11. The method of claim 1 wherein a source patch is located at the source patch location within the source image, the result patch is associated with a result patch location in the result image, one or more result proximity patches are located in the proximity of the result patch location in the result image, and the selecting operation comprises:
selecting the result patch that optimizes a cost function associated with the result patch location, the cost function characterizing a relationship between the one or more result proximity patches in the result image and at least a portion of the result patch that overlaps the one or more result proximity patches.

12. The method of claim 1 wherein a source patch is located at the source patch location within the source image, the result patch is associated with a result patch location in the result image, and the selecting operation comprises:
selecting the result patch that optimizes a cost function associated with the result patch location, the cost function characterizing a relationship between the result patch and a corresponding patch in a temporally displaced image of the result video sequence.

13. The method of claim 1 wherein a source patch is located at the source patch location within the source image, the result patch is associated with a result patch location in the result image, the result patch is selected from a training set including high spatial frequency image data, and further comprising:
augmenting the training set with one or more proximity patches of a different temporally displaced image of the result video sequence, each proximity patch being in proximity to a patch in the different temporally displaced image that corresponds to the result patch location in the result image.

14. The method of claim 1 wherein a source patch is located at the source patch location within the source image, the result patch is associated with a result patch location in the result image, and the selecting operation comprises:
selecting the result patch that optimizes a cost function associated with the result patch location, the cost function characterizing a relationship between the result patch and one or more of proximity patches, each proximity patch being in proximity to a patch in a different temporally displaced image that corresponds to the result patch location in the result image.

15. The method of claim 1 further comprising:
rendering the result patch in a result patch location in the result image corresponding to the source patch location within the source image.

16. The method of claim 1 wherein the result patch is selected from a training set including at least one associated pair of a high spatial frequency patch of image data and a lower frequency patch of image data.

17. The method of claim 1 wherein the result patch is selected from a training set of high spatial frequency image data generated from a high spatial frequency image associated with the video sequence.

18. The method of claim 1 wherein the result patch is selected from a training set of high spatial frequency image data generated from a high spatial frequency image that is independent of the video sequence.

19. One or more tangible computer-readable media storing a computer program for executing on a computer system a computer process for computing a result image in a result video sequence from a source image of a source video sequence, the result image having higher spatial frequency image data than the source image, the computer process comprising:
selecting, from a training set, a result patch for association with a source patch in a source patch location of the source image, the result patch being selected such that a cost function relating the source patch to a lower frequency patch associated with the selected result patch is optimized and spatial consistency within the result image and temporal consistency within the result video sequence are preserved.

20. The one or more tangible computer-readable media as recited in claim 19 wherein the result patch is selected from a training set including high spatial frequency image data.

21. The one or more tangible computer-readable media as recited in claim 19 wherein the result patch is associated with a result patch location in the result image, one or more result proximity patches are located in the proximity of the result patch location in the result image, and the cost function further relates the one or more result proximity patches in the result image to at least a portion of the result patch that overlaps the one or more result proximity patches.

22. The one or more tangible computer-readable media as recited in claim 21 wherein the cost function further relates the result patch to a corresponding patch in a temporally displaced image of the result video sequence.

23. The one or more tangible computer-readable media as recited in claim 21 wherein the cost function further relates the result patch to a corresponding patch in a temporally previous image of the result video sequence.

24. The one or more tangible computer-readable media as recited in claim 22 wherein the result patch is selected from a training set including high spatial frequency image data and further comprising:

augmenting the training set with one or more proximity patches of the temporally displaced image of the result video sequence, each proximity patch being in proximity to a patch in the temporally displaced image that corresponds to the result patch location in the result image.

25. The one or more tangible computer-readable media as recited in claim 22 wherein the result patch is selected from a training set including high spatial frequency image data and further comprising:

augmenting the training set with one or more proximity patches of a different temporally displaced image of the result video sequence, each proximity patch being in proximity to a patch in the different temporally displaced image that corresponds to the result patch location in the result image.

26. The one or more tangible computer-readable media as recited in claim 24 wherein the cost function further relates the result patch to the one or more of the proximity patches.

27. The one or more tangible computer-readable media as recited in claim 19 wherein the result patch is associated with a result patch location in the result image and the selecting operation comprises:

selecting the result patch that optimizes a cost function associated with the result patch location.

28. The one or more tangible computer-readable media as recited in claim 19 wherein a source patch is located at the source patch location within the source image, the result patch is associated with a result patch location in the result image, and the selecting operation comprises:

selecting the result patch that optimizes a cost function associated with the result patch location, the cost function characterizing a relationship between the source patch and a lower frequency patch associated with the result patch.

29. The one or more tangible computer-readable media as recited in claim 19 wherein a source patch is located at the source patch location within the source image, the result patch is associated with a result patch location in the result image, one or more result proximity patches are located in the proximity of the result patch location in the result image, and the selecting operation comprises:

selecting the result patch that optimizes a cost function associated with the result patch location, the cost function characterizing a relationship between the one or more result proximity patches in the result image and at least a portion of the result patch that overlaps the one or more result proximity patches.

30. The one or more tangible computer-readable media as recited in claim 19 wherein a source patch is located at the source patch location within the source image, the result patch is associated with a result patch location in the result image, and the selecting operation comprises:

selecting the result patch that optimizes a cost function associated with the result patch location, the cost function characterizing a relationship between the result patch and a corresponding patch in a temporally displaced image of the result video sequence.

31. The one or more tangible computer-readable media as recited in claim 19 wherein a source patch is located at the source patch location within the source image, the result patch is associated with a result patch location in the result image, the result patch is selected from a training set including high spatial frequency image data, and further comprising:

augmenting the training set with one or more proximity patches of a different temporally displaced image of the result video sequence, each proximity patch being in proximity to a patch in the different temporally displaced image that corresponds to the result patch location in the result image.

32. The one or more tangible computer-readable media as recited in claim 19 wherein a source patch is located at the source patch location within the source image, the result patch is associated with a result patch location in the result image, and the selecting operation comprises:

selecting the result patch that optimizes a cost function associated with the result patch location, the cost function characterizing a relationship between the result patch and one or more of proximity patches, each proximity patch being in proximity to a patch in a different temporally displaced image that corresponds to the result patch location in the result image.

33. The one or more tangible computer-readable media as recited in claim 19 further comprising: rendering the result patch in a result patch location in the result image corresponding to the source patch location within the source image.

34. The one or more tangible computer-readable media as recited in claim 19 wherein the result patch is selected from a training set including at least one associated pair of a high spatial frequency patch of image data and a lower frequency patch of image data.

35. The one or more tangible computer-readable media as recited in claim 19 wherein the result patch is selected from a training set of high spatial frequency image data generated from a high spatial frequency image associated with the video sequence.

36. The one or more tangible computer-readable media as recited in claim 19 wherein the result patch is selected from a training set of high spatial frequency image data generated from a high spatial frequency image that is independent of the video sequence.

37. A system for computing a result image in a result video sequence from a source image of a source video sequence, the result image having higher spatial frequency image data than the source image, the system comprising:

an inference module for selecting, from a training set, a result patch for association with a source patch in a source patch location of the source image, the result patch being selected such that a cost function relating the source patch to a lower frequency patch associated with the selected result patch is optimized and spatial consistency within the result image and temporal consistency within the result video sequence are preserved.

38. The system of claim 37 wherein the training set includes high spatial frequency image data.

39. The system of claim 37, wherein the result patch is associated with a result patch location in the result image, one or more result proximity patches are located in the proximity of the result patch location in the result image, and the cost function further relates the one or more result proximity patches in the result image to at least a portion of the result patch that overlaps the one or more result proximity patches.

40. The system of claim 37 wherein the cost function further relates the result patch to a corresponding patch in a temporally displaced image of the result video sequence.

41. The system of claim 39 wherein the cost function further relates the result patch to a corresponding patch in a temporally previous image of the result video sequence.

42. The system of claim 40 wherein the result patch is selected from a training set including high spatial frequency image data and the inference module augments the training set with one or more proximity patches of the temporally displaced image of the result video sequence, each proximity patch being in proximity to a patch in the temporally displaced image that corresponds to the result patch location in the result image.

43. The system of claim 40 wherein the result patch is selected from a training set including high spatial frequency image data and the inference module augments the training set with one or more proximity patches of a different temporally displaced image of the result video sequence, each proximity patch being in proximity to a patch in the different temporally displaced image that corresponds to the result patch location in the result image.

44. The system of claim 42 wherein the cost function further relates the result patch to the one or more of the proximity patches.

45. The system of claim 37 wherein the result patch is associated with a result patch location in the result image and the inference module selects the result patch that optimizes a cost function associated with the result patch location.

46. The system of claim 37 wherein the result patch is associated with a result patch location in the result image and the inference module selects the result patch that optimizes a cost function associated with the result patch location, the cost function characterizing a relationship between the source patch and a lower frequency patch associated with the result patch.

47. The system of claim 37 wherein the result patch is associated with a result patch location in the result image, one or more result proximity patches are located in the proximity of the result patch location in the result image, and the selecting operation comprises:
 selecting the result patch that optimizes a cost function associated with the result patch location, the cost function characterizing a relationship between the one or more result proximity patches in the result image and at least a portion of the result patch that overlaps the one or more result proximity patches.

48. The system of claim 37 wherein the result patch is associated with a result patch location in the result image and the inference module selects the result patch that optimizes a cost function associated with the result patch location, the cost function characterizing a relationship between the result patch and a corresponding patch in a temporally displaced image of the result video sequence.

49. The system of claim 37 wherein the result patch is associated with a result patch location in the result image, the result patch is selected from a training set including high spatial frequency image data, and the inference module augments the training set with one or more proximity patches of a different temporally displaced image of the result video sequence, each proximity patch being in proximity to a patch in the different temporally displaced image that corresponds to the result patch location in the result image.

50. The system of claim 37 wherein the result patch is associated with a result patch location in the result image, and inference module selects the result patch that optimizes a cost function associated with the result patch location, the cost function characterizing a relationship between the result patch and one or more of proximity patches, each proximity patch being in proximity to a patch in a different temporally displaced image that corresponds to the result patch location in the result image.

51. The system of claim 37 further comprising:
 a rendering module rendering the result patch in a result patch location in the result image corresponding to the source patch location within the source image.

52. The system of claim 37 wherein the result patch is selected from a training set including at least one associated pair of a high spatial frequency patch of image data and a lower frequency patch of image data.

53. The system of claim 37 wherein the result patch is selected from a training set of high spatial frequency image data generated from a high spatial frequency image associated with the video sequence.

54. The system of claim 37 wherein the result patch is selected from a training set of high spatial frequency image data generated from a high spatial frequency image that is independent of the video sequence.

* * * * *